(12) United States Patent
Kelkar et al.

(10) Patent No.: US 6,345,375 B1
(45) Date of Patent: Feb. 5, 2002

(54) PACKET-BASED COMMUNICATION METHODS AND SYSTEMS HAVING IMPROVED DATA THROUGHPUT

(75) Inventors: Kris Kelkar, Camarillo; David M. Stewart, Ventura, both of CA (US)

(73) Assignee: California Amplifier, Inc., Camarillo, CA (US)

(*) Notice: Subject to any disclaimer, the term of this patent is extended or adjusted under 35 U.S.C. 154(b) by 0 days.

(21) Appl. No.: 09/257,161

(22) Filed: Feb. 24, 1999

(51) Int. Cl.$^7$ .................... G08C 25/02; H04L 1/18; H03M 13/00
(52) U.S. Cl. .............. 714/748; 714/749; 714/776
(58) Field of Search .................. 714/748, 749, 714/750, 751, 774, 776

(56) References Cited

U.S. PATENT DOCUMENTS

| | | | |
|---|---|---|---|
| 5,629,948 A | | 5/1997 | Hagiwara et al. ............. 714/748 |
| 5,768,533 A | * | 6/1998 | Ran ............................. 709/247 |
| 5,790,806 A | | 8/1998 | Koperda ...................... 709/252 |
| 5,818,852 A | | 10/1998 | Kapoor ........................ 714/749 |
| 5,870,406 A | * | 2/1999 | Ramesh et al. ............. 714/709 |
| 5,923,650 A | | 7/1999 | Chen et al. .................. 370/331 |
| 6,088,826 A | * | 7/2000 | Teich ........................... 714/774 |
| 6,167,270 A | | 12/2000 | Rezaiifar et al. ........... 455/442 |

* cited by examiner

*Primary Examiner*—Emmanuel L. Moise
(74) *Attorney, Agent, or Firm*—Koppel & Jacobs (57) ABSTRACT

Packet-based communication methods and systems are provided which improve data throughput and which respond to different error-rate conditions with modifications appropriate for those conditions. In method embodiments, data frames are initially formed to each have N data packets and a frame error code. Data frames are then transmitted and checked. In response to the check, data packets of error-free data frames are routed through the system and data frames that are in error are retransmitted. The checking, processing and retransmitting steps are repeated until all data packets are routed through the communication system. In another method embodiment, data packets of each data frame found to be in error in the checking step are inserted into a data frame of the forming step. In a feedback feature, a system error rate is determined and, in response, N is periodically updated to a value that realizes the best throughput under the current noise condition of the transmission link.

38 Claims, 6 Drawing Sheets

| DATA THROUGHPUT | | | | |
|---|---|---|---|---|
| BIT ERROR RATE | 0.8% | 5.0% | 10.0% | 25.0% |
| N = 1 | | | | |
| PACKET SIZE (BITS) | 8,000 | 8,000 | 8,000 | 8,000 |
| ACK/TRANSMISSION O/H | 7,000 | 7,000 | 7,000 | 7,000 |
| SUBTOTAL | 15,000 | 15,000 | 15,000 | 15,000 |
| RETRANSMISSION O/H | 225 | 1,406 | 2,813 | 7,031 |
| CAPACITY USAGE | 15,225 | 16,406 | 17,813 | 22,031 |
| THROUGHPUT | 52.5% | 48.8% | 44.9% | 36.3% |
| N = 3 | | | | |
| PACKET SIZE (BITS) | 24,000 | 24,000 | 24,000 | 24,000 |
| ACK/TRANSMISSION O/H | 7,000 | 7,000 | 7,000 | 7,000 |
| SUBTOTAL | 31,000 | 31,000 | 31,000 | 31,000 |
| RETRANSMISSION O/H | 961 | 6,006 | 12,013 | 30,031 |
| CAPACITY USAGE | 31,961 | 37,006 | 43,013 | 61,031 |
| THROUGHPUT | 75.1% | 64.9% | 55.8% | 39.3% |
| N = 5 | | | | |
| PACKET SIZE (BITS) | 40,000 | 40,000 | 40,000 | 40,000 |
| ACK/TRANSMISSION O/H | 7,000 | 7,000 | 7,000 | 7,000 |
| SUBTOTAL | 47,000 | 47,000 | 47,000 | 47,000 |
| RETRANSMISSION O/H | 2,209 | 13,806 | 27,613 | 69,031 |
| CAPACITY USAGE | 49,209 | 60,806 | 74,613 | 69,031 |
| THROUGHPUT | 81.3% | 65.8% | 53.6% | 34.5% |

PACKET-BASED COMMUNICATION METHODS AND SYSTEMS HAVING IMPROVED DATA THROUGHPUT

BACKGROUND OF THE INVENTION

1. Field of the Invention

The present invention relates generally to packet-based communication systems and more particularly to packet-based data routing.

2. Description of the Related Art

Data is a generic term that denotes facts, numbers, letters and/or symbols that convey information. Data typically includes digital data signals (signal information in digital form), voice signals (signals in a frequency band that represent voice) and video signals (signals in a frequency band that represent images).

The type of data traffic generally determines appropriate routing techniques when that data is carried over a communications system. Voice data, for example, requires a dedicated communication path to facilitate real-time communication. In contrast, digital data signals tend to be bursty in nature, need not be communicated in real time and can therefore share network resources with other bursty users. Some types of data have an urgent delivery schedule while others can be sent when convenient.

Data signals are therefore often routed through communication systems in accordance with different routing methods. A first method is connection-oriented routing in which a communications path between a signal source and a signal destination is fixed for the duration of the message. Because the path is fixed, the data arrives at the receiver in the order it was transmitted. A connection-oriented service typically uses error control coding to provide data protection in case the network connection becomes noisy. If the message is degraded (e.g., by noise), it must be retransmitted from the beginning.

A second method is connectionless routing which relie's on packet-based transmissions in which the message is divided into data packets which are separately routed through the system. Because these packets do not necessarily travel over the same route nor arrive in the order of transmission, they carry overhead information (e.g., source address, destination address, routing information and packet-order information) that maintains message integrity. Because of the overhead information, connectionless routing typically avoids the need to retransmit an entire message.

Noisy transmission links, however, introduce errors into the packet-based data. When data packets do not arrive error free at the receiver, they must be retransmitted and this action necessarily degrades the communication system's data throughput. The noise can be quantified by its induced bit error rate and, generally, the higher the bit error rate, the greater the number of packets which must be retransmitted and the lower the system throughput.

Various methods have been proposed to improve throughput by modifying the transmission of packets. In U.S. Pat. No. 5,818,852, for example, a frame's data is divided into smaller portions (termed "subframes") which each have a respective error code. In addition, a frame header carries routing and identification information and an error code is also generated for the header.

At the receiver, error-free subframes are stored but an acknowledgment is sent to the transmitter only if all subframes are error free. In the absence of an acknowledgement, the transmitter continues to retransmit the entire frame until all of its subframes have been received error free.

Another proposed method for improving communication throughput is found in U.S. Pat. No. 5,629,948. In addition to data, each transmission frame in this Patent has a control section that includes data for directing transmission and retransmission and for frame identification. Similar to U.S. Pat. No. 5,818,852, the data in each frame is formed with a plurality of data sections but, in contrast, each carries a respective error-correction code. Upon frame reception, the error-free data sections are saved and an acknowledgement sent back to the transmitter.

In further contrast to U.S. Pat. No. 5,818,852, the data sections that have errors are also saved and a retransmission request is sent to the transmitter for each of these error-containing data sections. In response, the transmitter produces an error correction code for each error-containing data section. When the transmitter has received M retransmission requests, it forms a frame with the respective error correction codes and transmits this frame. In an exemplary process, N=M=3.

With a first one of the error-correction codes, the receiver carries out an error-correction operation with each stored error-containing data section because the order of the error-correction codes may differ from the order of the stored error-containing data sections. When an error-containing data section is corrected to be error free, an acknowledgment is sent to the transmitter and the process repeated for each of the other error-correction codes.

In a low-noise transmission link, these proposed packet-transmission methods will typically improve throughput because each subframe (or data section) does not have to individually carry the overhead (e.g., routing and identification information) that is supplied by its frame. However, U.S. Pat. No. 5,629,948 carries additional overhead of individual packet error codes and requires time-consuming storing of error-free subframes in noisy conditions even though entire frames are retransmitted. U.S. Pat. No. 5,818,852 also carries additional overhead of individual packet error codes and adds a complex, time-consuming error-correction process.

SUMMARY OF THE INVENTION

The present invention is directed to packet-based communication methods and systems that have improved data throughput and that can effectively modify themselves to respond to different error-rate conditions.

In one method embodiment, data frames are initially formed to each have N data packets and a frame error code. Data frames are then transmitted and checked. In response to the check, data packets of error-free data frames are routed through the system and data frames that are in error are retransmitted. The checking, processing and retransmitting steps are repeated until all data packets are routed through the communication system.

In another method embodiment, data frames are again initially formed to each have N data packets and a frame error code. Data frames are then transmitted and checked and in response to the check, data packets of error-free data frames are routed through the system. In contrast, however, data packets of each data frame found to be in error in the checking step are inserted into a data frame of the forming step. Transmitting, checking, routing and inserting steps are then repeated until all data packets are routed.

In a feedback feature of the invention, a system error rate is determined and, in response, N is periodically updated to a value that realizes the best data throughput under the current noise condition of the transmission link.

In the invention's methods, frame overhead is reduced by carrying only a frame error code and feedback is provided to respond to changing error rate conditions by adjusting N to a value that realizes the best data throughput for the changed conditions. A choice of retransmission processes (i.e., with or without insertion into a frame of the forming step) provides further process flexibility for increasing throughput in different bit error rate conditions.

The teachings of the invention can be practiced with communication systems that include data sources and sinks, data-interconnection modules, transceivers, transmission links and processors that are programmed to direct the systems along the methods of the invention.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
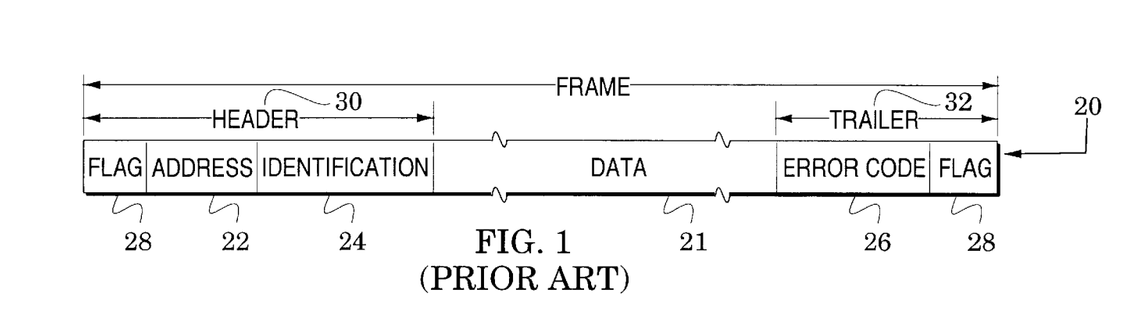
FIG. 1 is a diagram of a conventional data frame in packet-based transmission systems.
Figure 2A:
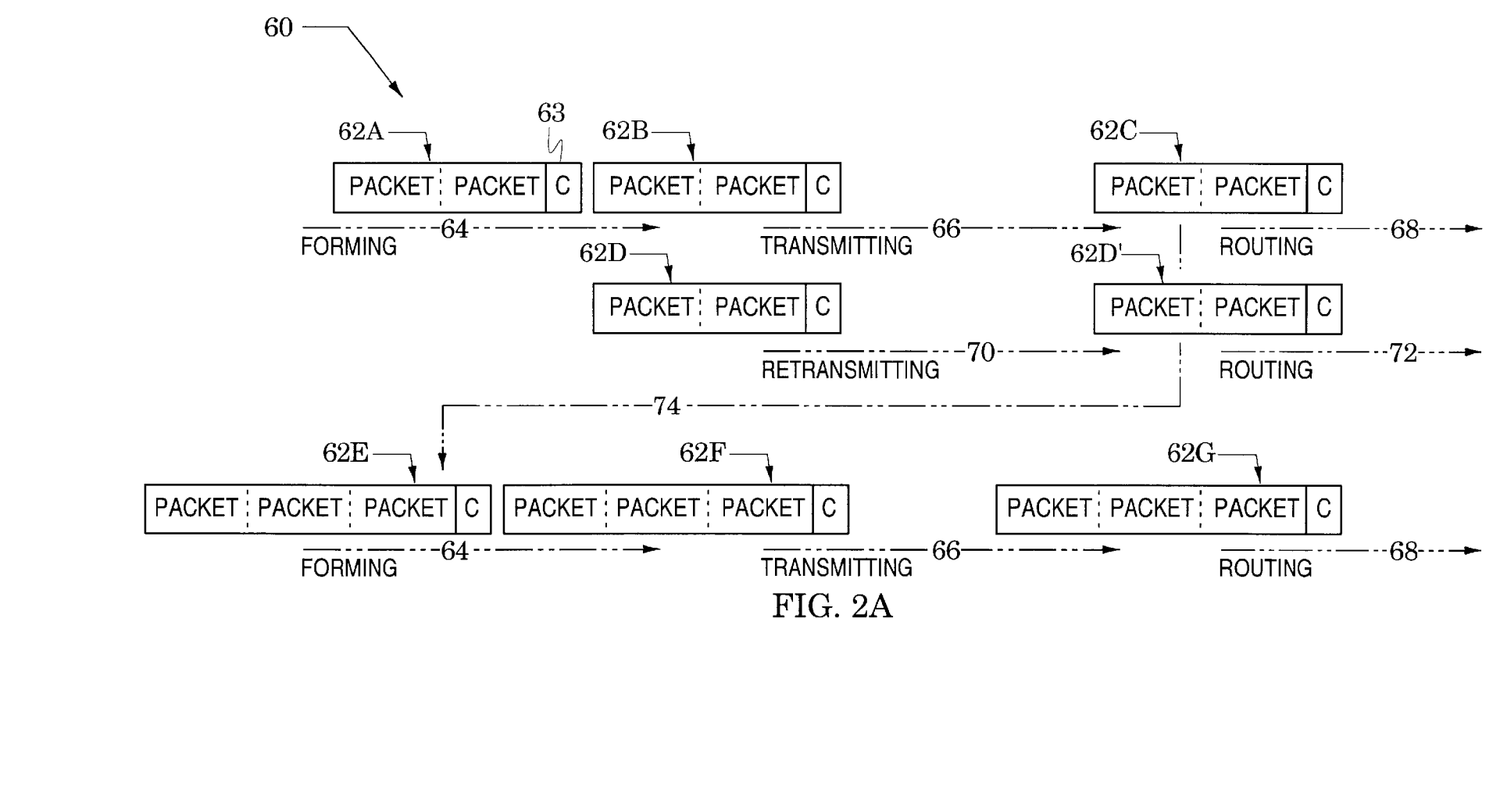
FIG. 2A is a diagram of frame generation and routing.
Figure 2B:
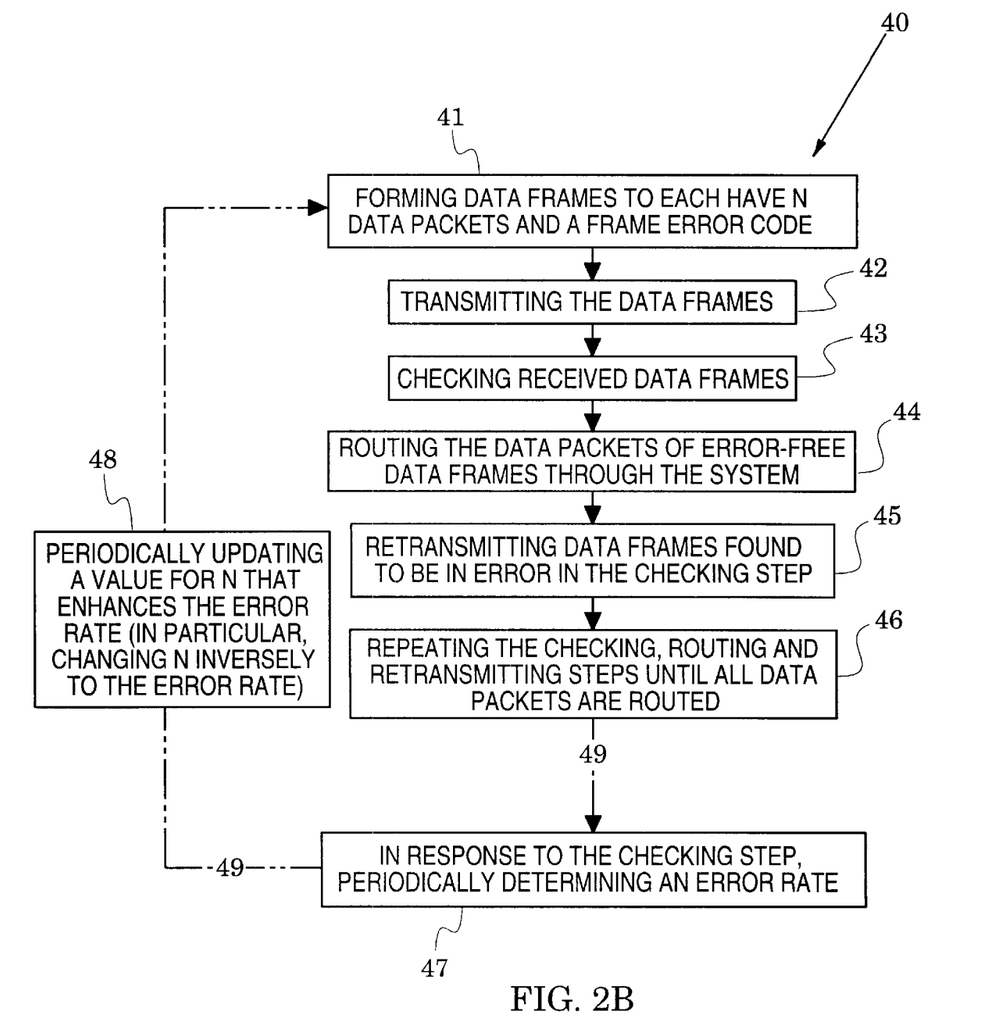
FIG. 2B is a flow chart of a communication method embodiment of the present invention with some of its process steps illustrated in FIG. 2A.

An embodiment of the communication methods of the invention is detailed in the flow chart 40 of FIG. 2B and the process steps of this flow chart are illustrated in a respective diagram 60 of FIG. 2A. A description of these figures is enhanced by preceding it with a glance at a conventional data frame 20 as shown in FIG. 1.

The frame 20 carries data 22 and, to control the routing of this data, it also carries control information which may include a frame number, source and destination addresses and error codes as well as information that facilitates packet sequencing, acknowledgments and retransmission requests. This type of information is indicated generally in FIG. 1 as an address 22, identification 24 and error codes 26. In addition, flags 28 are generally used to denote the frame's beginning and end. This control information is typically grouped into a header 30 and a trailer 32.

The diagram 60 of FIG. 2A includes data frames 62 in which, for simplicity, the control information of FIG. 1 is simply included in a control field 63 designated by the letter "C". Although such control information is generally grouped into headers and trailers as in FIG. 1, it is sufficient for the invention that such information is carried by the data frames regardless of its location within the frames.

In a first process step 41 of FIG. 2B, data frames are formed to each carry N data packets and a frame error code (e.g., a cyclic redundancy code). These data frames are subsequently transmitted in process step 42. To illustrate, FIG. 2A shows exemplary data frames 62A, 62B and 62C. For illustrative purposes, it is assumed that N=2 so that each data frame includes two data packets and the frame error code is included in the control information 63. Broken forming arrow 64 indicates forming and transition of the data frames to the position of data frame 62B from where frames are transmitted (as indicated by the broken transmit arrow 66) to a received position of data frame 62C.

In a third process step 43 of FIG. 2B, received data frames are checked with their respective error codes and, in a fourth process step 44, data packets of error-free data frames are routed through the communication system (to addresses contained in each frame's control field 63). This routing is indicated by a broken routing arrow 68 in FIG. 2A.

In process step 45 of FIG. 2B, data frames that were found in error in process step 44 are retransmitted. This step is exemplified in FIG. 2A by the data frame 62D which is being retransmitted as indicated by a broken retransmitting arrow 70. A first method portion of the flow chart 40 of FIG. 2B terminates with step 46 in which the checking, routing and retransmitting steps (43, 44 and 45) are repeated until all data packets are routed. In FIG. 2A, this last step is illustrated by showing the data frame 62D in a received position 62D' where it is now found to be error-free and accordingly, is routed as indicated by another broken routing arrow 72.

A feedback feature of the invention is illustrated in FIG. 2B by process steps 47 and 48 along a feedback path 49. In step 47, the results of the checking step 43 are used to determine an error rate (e.g., a bit error rate). This error rate is then used in step 48 to update a value for N that improves the data throughput. As further explained below, N is generally changed inversely to changes in bit error rate.

Feedback steps 47 and 48 are illustrated in FIG. 2A by a broken feedback arrow 74 which symbolizes that N is updated from two to three so that the forming, transmitting and routing processes of broken arrows 64, 66 and 68 are now conducted with data frames 62E, 62F and 62G that each carry three data packets.

If it is known that a low-noise transmission link is to be used, the methods of FIG. 2B permit the selection of a large value for N so that the overhead of each frame's control field 63 is spread over a larger number of data packets with a consequent increase in data throughput. On the other hand, N can be selected to have a lower value for operation in a high-noise transmission link in which a larger number of data retransmissions will be required. This latter selection will reduce the degradation of data throughput caused by the retransmissions.

If it is anticipated that noise conditions will be changing in a transmission link, the feedback path 49 of FIG. 2B facilitates a constant updating of N to best counter the changed conditions. As will be shown below by the exemplary test results of FIG. 4, N is preferably changed inversely to changes in error rate, e.g., lowering N improves data throughput in the high error rate conditions of noisy transmission links and raising N improves data throughput in low error rate conditions. Preferably, the processes of the feedback path 49 are repeated over time (e.g., periodically or continuously) to deliver the best data throughput that can be provided as noise conditions change in the transmission link.

Figure 3A:
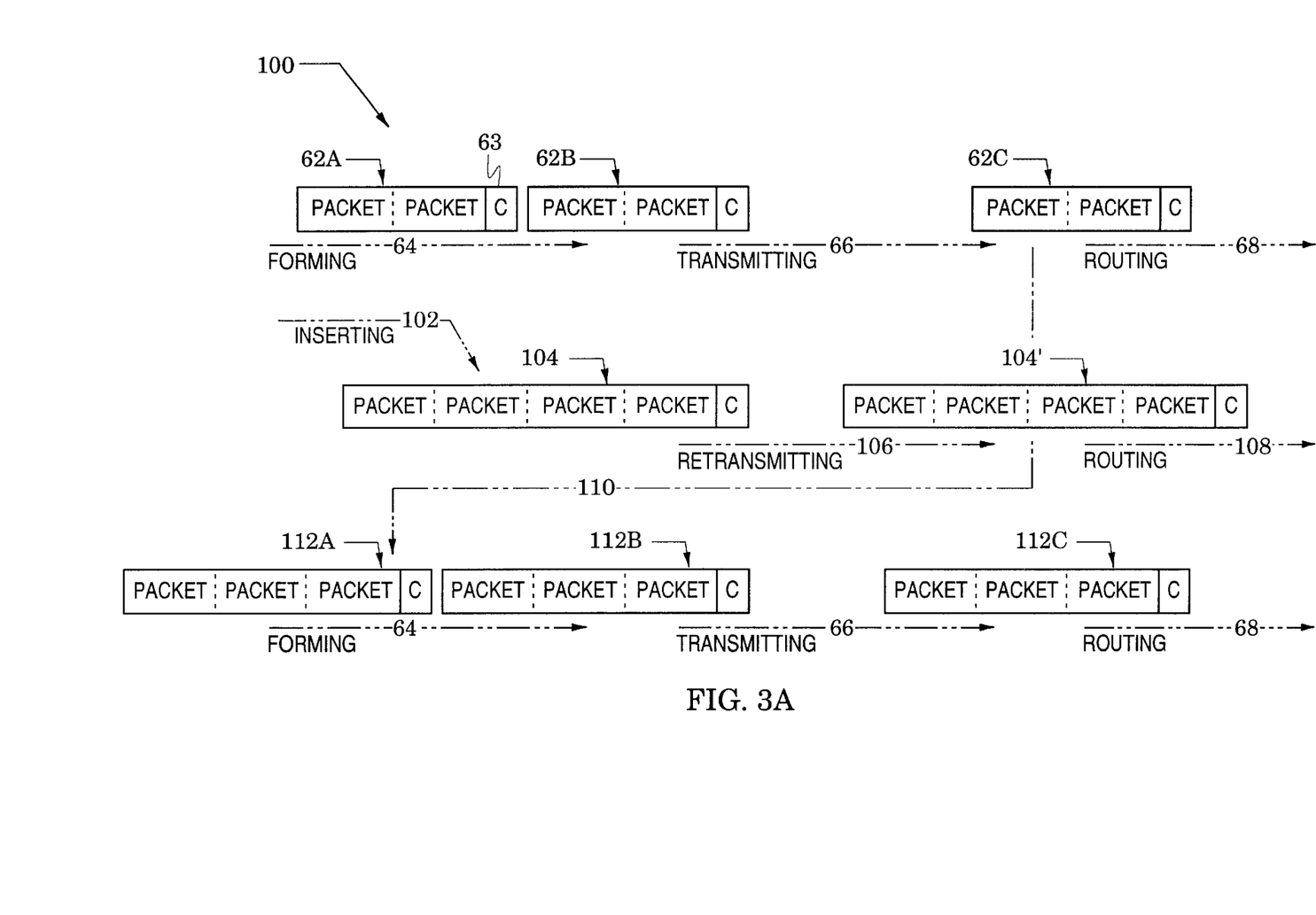
FIG. 3A is another diagram of frame generation and routing.
Figure 3B:
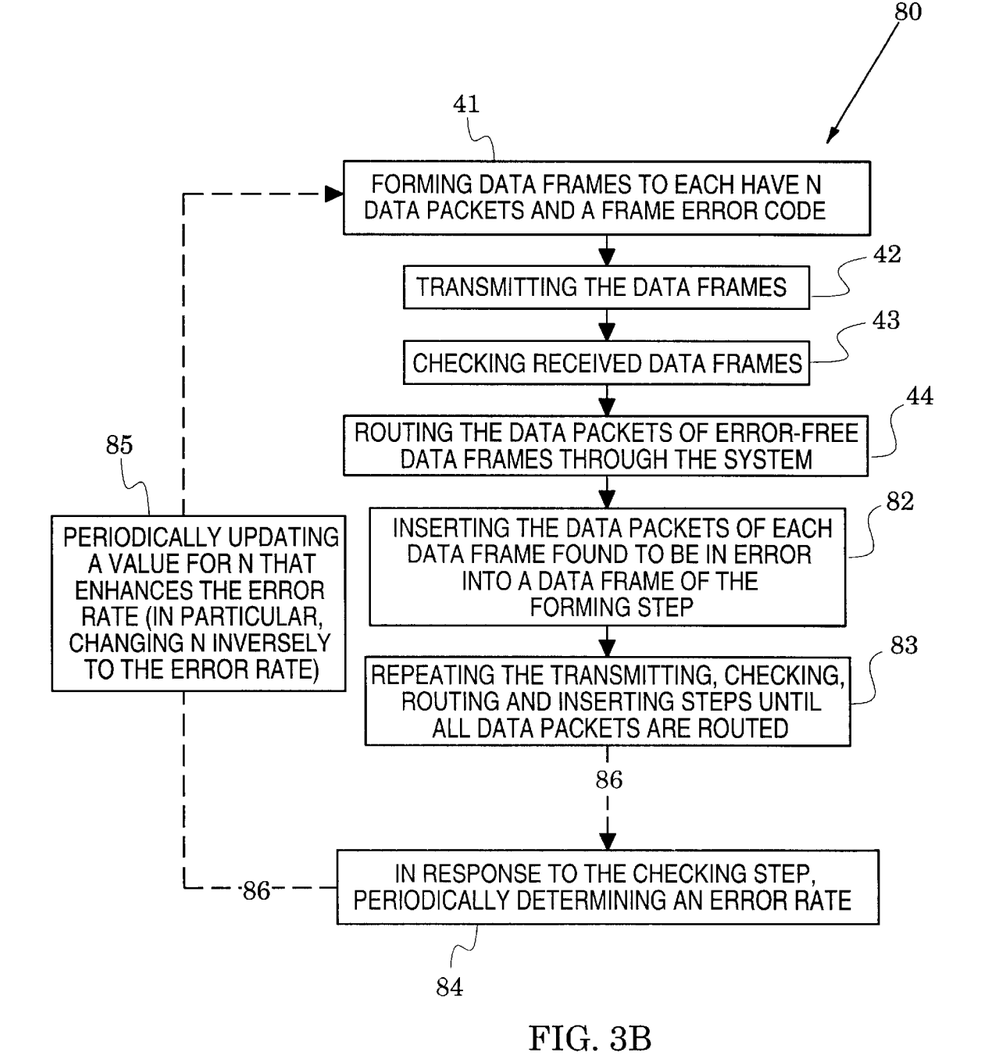
FIG. 3B is a flow chart of another communication method embodiment with some of its process steps illustrated in FIG. 3A.

Another embodiment of the communication methods of the invention is detailed in the flow chart 80 of FIG. 3B and the process steps of this flow chart are illustrated in a respective diagram 100 of FIG. 2A. FIGS. 3A and 3B are respectively similar to FIGS. 2A and 2B with like elements indicated by like reference numbers.

FIG. 3B shows that this method embodiment has the same initial process steps 41, 42, 43 and 44 as that of FIG. 2B and FIG. 3A shows the same initial forming, transmitting and routing functions as does FIG. 2A. In process step 82 of FIG. 3B, however, data frames that were found in error in process step 43 are inserted into a data frame of the forming step 41. This step is exemplified in FIG. 2A by the broken insertion arrow 102 leading to a data frame 104 which now contains two new data packets and two older data packets that require retransmitting.

A first method portion of the flow chart 80 terminates with step 83 in which the transmitting, checking, routing and inserting steps (42, 43, 44, 45 and 82) are repeated until all data packets are routed. In FIG. 2A, this last step is illustrated by showing the data frame 104 being retransmitted as indicated by a broken retransmitting arrow 106 (although this is termed a retransmitting arrow, two of the data packets are being transmitted for the first time). From a received position 104', the data frame is now found to be error-free and accordingly, is routed as indicated by another broken routing arrow 108.

Similar to the flow chart 40 of FIG. 2B, the method of FIG. 3B also has a feedback feature. This is illustrated by process steps 84 and 85 along a feedback path 86 in FIG. 3B. In step 84, the results of the checking step 43 are used to determine an error rate and this error rate is used in step 85 to update a value for N that improves the data throughput.

Feedback steps 86 and 85 are illustrated in FIG. 3A by broken feedback arrow 110 which symbolizes that N is updated from two to three so that the forming, transmitting and routing processes of broken arrows 64, 66 and 68 are now conducted with data frames 112A, 112B and 112C that each carry three data packets.

If it is known that a low-noise transmission link is to be used, the methods of FIG. 2B permit the selection of a large value for N so that the overhead of each frame's control field 63 is spread over a larger number of data packets with a consequent increase in data throughput. On the other hand, N can be reduced for operation in a high-noise transmission link in which a larger number of data retransmissions will be required.

This reduces the degradation of data throughput caused by the retransmissions. The inserting step 82 of FIG. 3B (102 in FIG. 3A) facilitates an additional improvement of data throughput in the high error rate conditions of noisy transmission links because it spreads the overhead of each frame's control field 63 over an even larger number of data packets.

Although it is unlikely that the inserting step would be repeated with the same data packets (i.e., finding the four data packets of data frame 104' in FIG. 3A to be in error and therefore inserting them into a packet of the forming step to generate a frame of six data packets), the program of a processor that is generally programmed in accordance with FIG. 3B can be modified to terminate this type of repetitive process at a desired point.

Figure 4:
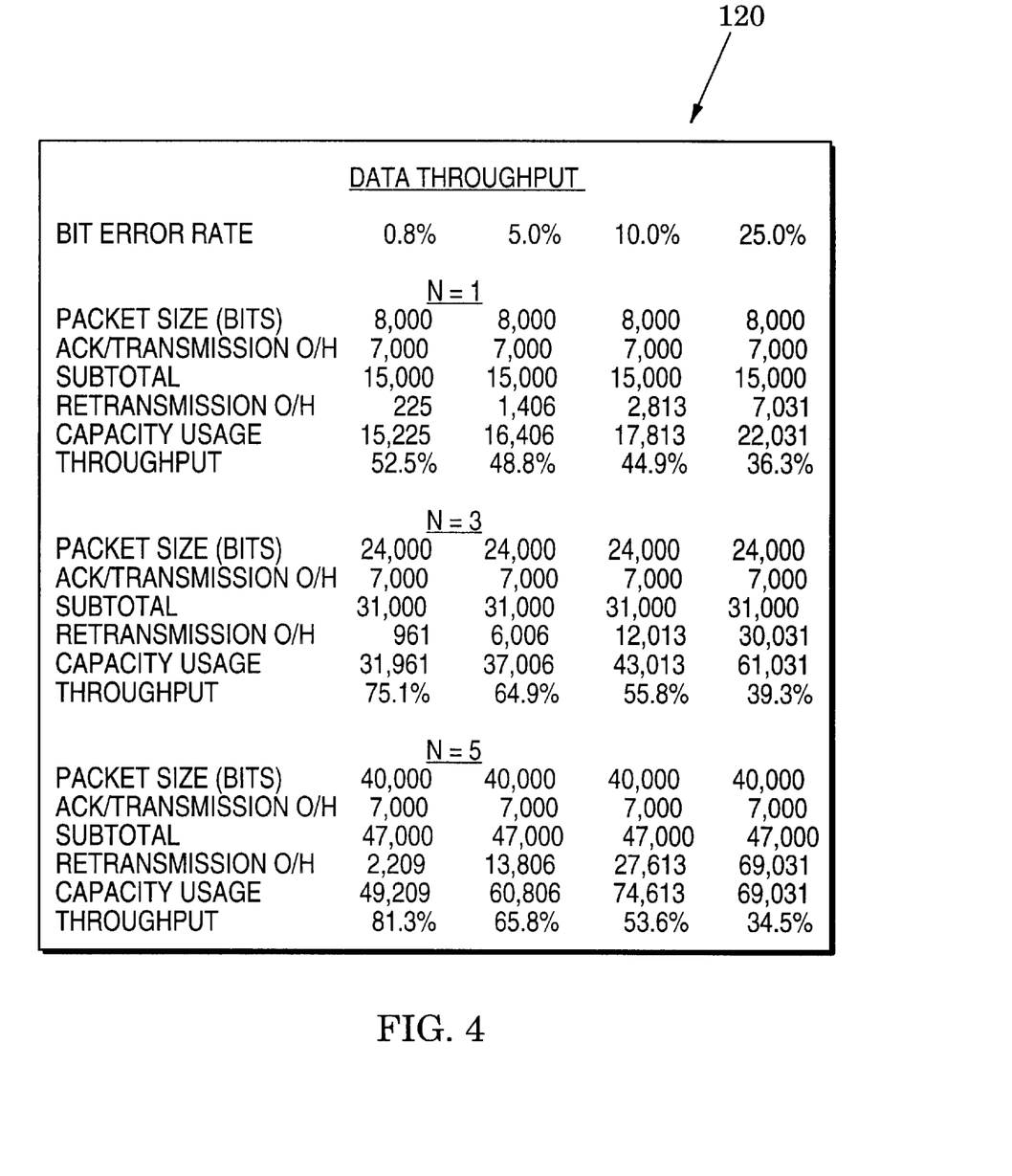
FIG. 4 is a table that illustrates throughput improvement in one method embodiment of the invention.

Table 120 of FIG. 4 illustrates an analysis of data throughput when using process steps 41 through 46 of FIG. 2B. The table addresses three selections of N (in particular, N=1, 3 and 5) for process step 41 and shows the data throughput achieved with each of these selections when a transmission link imposes bit error rates of 0.8, 5.0, 10.0 and 25.0 per cent (expressed differently, bit error rates of $1.00E^{-06}$, $6.25E^{-06}$, $1.25E^{-05}$ and $3.13E^{-05}$).

In this analysis, a packet size of 8000 bytes was assumed so that a data frame carries 8000, 24,000 and 40,000 bytes of data in the respective cases of N=1, 3 and 5. Transmission overhead (control field 63 in FIG. 2A) was assumed to be 7,000 bytes —one part of this overhead is for handling acknowledgment (ACK). In an error-free environment, therefore, a byte subtotal of 15,000, 31,000 and 47,000 bytes would be used in the respective cases of N=1, 3 and 5.

The averages of bytes required for frame retransmission were calculated for each of the four assumed bit error rates and each of the three selections of N. These entries summed with the byte subtotal described above yielded the capacity usage byte numbers of the table. Throughput was then calculated as the ratio of packet size to capacity usage.

It is noted that throughput is highest for N=5 for bit error rates of 0.8% and 5.0% and highest for N=3 when the bit error rate rose to 10.0% and 25.0%. This trend indicates that throughput can be improved by reducing N in high bit error rate conditions and increasing N in low bit error rate conditions (i.e., changing N inversely to bit error rate).

In the invention, this adjustment of N for realizing increased throughput in different conditions is facilitated by the processes of the feedback paths 49 and 86 of FIGS. 2B and 3B. The inserting process 82 of FIG. 3B provides further process flexibility for increasing throughput in different bit error rate conditions.

Figure 5:
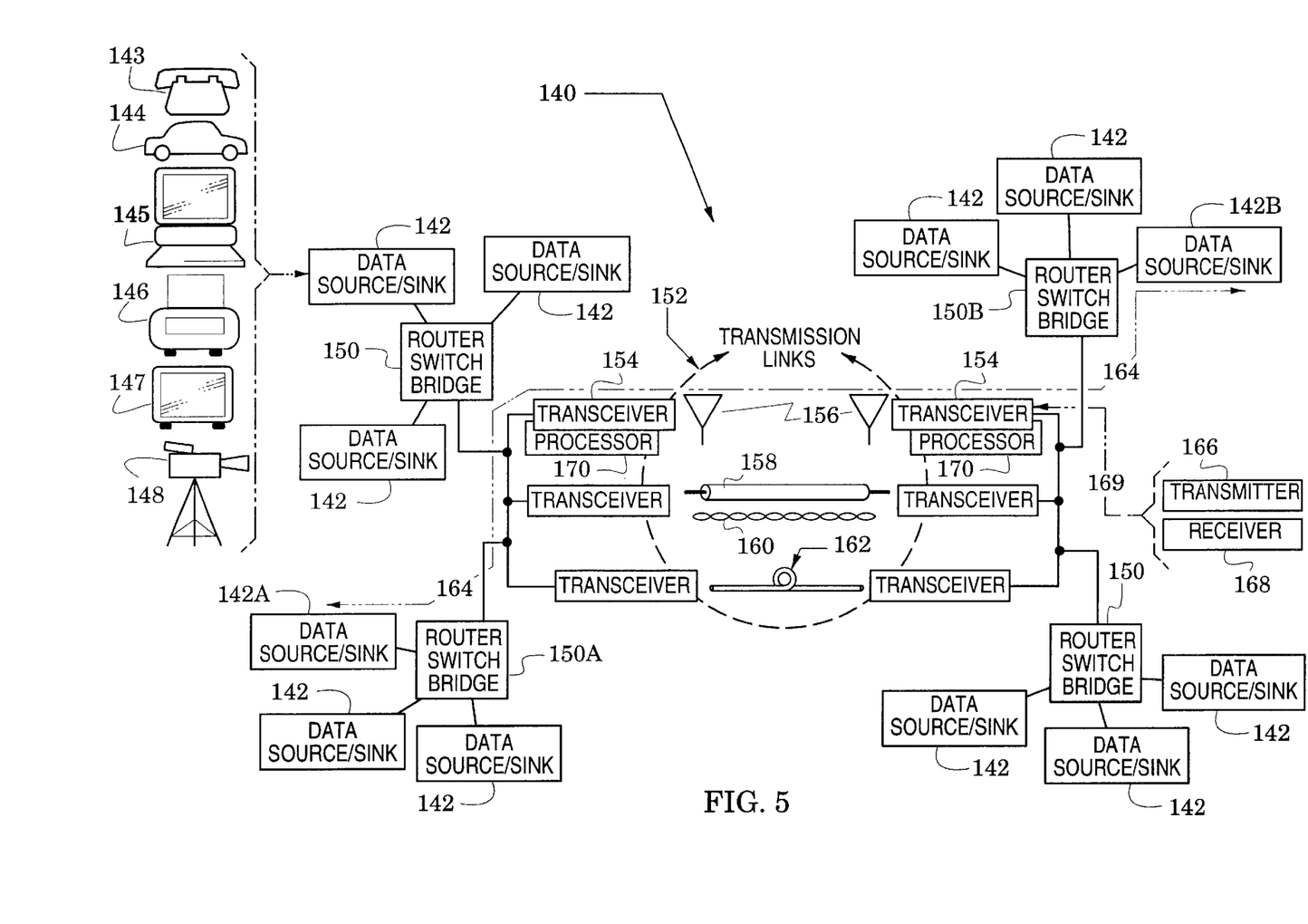
FIG. 5 is a diagram of a communication system embodiment of the invention.

The teachings of the invention can be practiced with various communication systems. FIG. 5, for example, illustrates a communication system 140 which is especially suited for routing data between a plurality of data source/sinks 142. As shown, exemplary data source/sinks include telephones 143, mobile units 144, computers 145, facsimile 146, television receivers 147 and video cameras 148.

The communication system 140 is formed from a plurality of data-interconnection modules 150, at least one transmission link 152 and transceivers 154. As shown in FIG. 5, exemplary transmission links include a wireless link 156, a wire link (such as a twisted pair 158 or a coaxial cable 159) and an optical link 160.

The transceivers associated with the wireless and wire links include conventional structures for these link types (e.g., low-noise amplifiers, upconverters, downconverters, filters and power amplifiers). In addition, the transceivers associated with the optical link can include conventional optical structures (e.g., laser sources, optical modulators and optical detectors).

Exemplary data-interconnection modules are routers, switches and bridges and accordingly, the modules 150 can comprise one or all of these structures. Switches are used to transfer data signals between communication circuits. Bridges are generally configured to form connections between communication networks. They link network segments and pass data frames across the link. Routers are configured to connect similar or different communication networks that are served by multiple communication paths. They select from the multiple paths, buffer packets for retransmission in each network and insure that signals reach their destination.

The communication system 140 can form various transmission paths between the data source/sinks 142. For example, appropriate commands to data-interconnection modules 150A and 150B can establish a communication path 164 between data source/sinks 142A and 142B. One of these data source/sinks may operate only as a data source and the other as a data sink so that the path 164 is a simplex path.

Alternatively, the path 164 can be a duplex path for coupling modules that each act as both a data source and a sink. If carrying only simplex communication paths, the transceivers 154 may each be replaced by a transmitter 166 or a receiver 168 as indicated by the broken replacement arrow 169.

The communication system 140 further includes processors 170 (e.g., microprocessors) that are programmed to configure the system's structures so as to generate desired communication paths (e.g., the path 164) and route data over these paths. These processors are therefore programmed in accordance with process steps of FIGS. 2B and 3B and can be included in appropriate structures. The communication path 164, for example, is shown to be using the wireless link 156 and to facilitate this path, the processors 170 are preferably part of the transceivers 154 that are associated with this link.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of improving data throughput in a packet-based communication system, comprising the steps of:
    forming data frames to each have N data packets and a frame error code;
    transmitting said data frames;
    checking received data frames;
    in response to said checking step, determining an error rate;
    updating an integer value for N that enhances said data throughput;
    routing the data packets of error-free data frames;
    retransmitting data frames found to be in error; and
    repeating said checking, processing and retransmitting steps until all data packets are routed.

2. The method of claim 1, wherein said updating step includes the step of changing N inversely to said error rate.

3. The method of claim 1, wherein said determining step includes the step of comparing data frames found to be in error to total number of data frames checked in said checking step.

4. The method of claim 1, wherein said error rate is a bit error rate.

5. The method of claim 1, wherein said routing step includes the step of distributing said data packets through said communication system.

6. The method of claim 1, further including a step of forming said frame error code as a cyclic redundancy code.

7. The method of claim 1, wherein said checking step includes the step of verifying each data frame with its respective frame error code.

8. The method of claim 1, further including the step of excluding from said data frames in said forming step, error codes restricted to any one of said data packets.

9. The method of claim 1, further including the step of restricting N to be less than 10.

10. The method of claim 1, further including the step of restricting N to be less than 15.

11. The method of claim 1, wherein said transmitting step includes the step of including frame identification and routing information in each of said data frames.

12. A method of improving data throughput in a packet-based communication system, comprising the steps of:
    forming data frames to each have N data packets and a frame error code;
    transmitting said data frames;
    checking received data frames;
    routing the data packets of error-free data frames;
    inserting the data packets of each data frame found to be in error in said checking step into a data frame of said forming step; and
    repeating said transmitting, checking, routing and inserting steps until all data packets are routed.

13. The method of claim 12, further including the steps of:
    in response to said checking step, determining an error rate; and
    updating an integer value for N that enhances said data throughput.

14. The method of claim 13, wherein said updating step includes the step of changing N inversely to said error rate.

15. The method of claim 13, wherein said routing step includes the step of comparing data frames found to be in error to total number of data frames checked in said checking step.

16. The method of claim 13, wherein said error rate is a bit error rate.

17. The method of claim 12, wherein said processing step includes the step of distributing said data packets through said communication system.

18. The method of claim 12, further including a step of forming said frame error code as a cyclic redundancy code.

19. The method of claim 12, wherein said checking step includes the step of verifying each data frame with its respective frame error code.

20. The method of claim 12, further including the step of excluding from said data frames in said forming step, error codes restricted to any one of said data packets.

21. The method of claim 12, further including the step of restricting N to be less than 10.

22. The method of claim 12, further including the step of restricting N to be less than 15.

23. The method of claim 12, wherein said transmitting step includes the step of including frame identification and routing information in each of said data frames.

24. A packet-based communication system for routing data between data sources and data sinks, comprising:
    at least one transmission link;
    a plurality of data-interconnection modules that interface with said data sources and data sinks;
    a transmitter that couples at least one of said data interconnection modules to said transmission link;
    a receiver that couples at least one of said data interconnection modules to said transmission link; and
    a processor programmed to conduct the steps of:
        a) gathering data from said data source;
        b) from said data, forming data frames to each have N data packets and a frame error code;
        c) transmitting said data frames through said transmission link;
        d) checking received data frames;
        e) routing data packets of error-free data frames to said data sink;
        f) retransmitting data frames found to be in error; and
        g) repeating said checking, processing and retransmitting steps until all data packets are routed;
    wherein said processor is further programmed to conduct the steps of:
        in response to said checking step, determining an error rate; and updating an integer value for N that enhances said data throughput.

25. The communication system of claim 24, wherein said updating step includes the step of changing N inversely to said error rate.

26. The communication system of claim 24, wherein said at least one transmission link is one of a group comprised of a wireless link, a wire link and an optical link.

27. The communication system of claim 24, wherein at least one of said data interconnection modules is one of a group comprised of a router, a switch and a bridge.

28. The communication system of claim 24, wherein said processor is included in a selected one of said data-interconnection modules, said transmitter and said receiver.

29. The communication system of claim 24, wherein said data source is one of a group comprised of a computer, a mobile telephone and a video source.

30. The communication system of claim 24, wherein said data sink is one of a group comprised of a computer, a mobile telephone and a video monitor.

31. A packet-based communication system for routing data between data sources and data sinks, comprising:
    at least one transmission link;
    a plurality of data-interconnection modules that interface with said data sources and data sinks;
    a transmitter that couples at least one of said data interconnection modules to said transmission link;
    a receiver that couples at least one of said data interconnection modules to said transmission link; and
    a processor programmed to conduct the steps of:
       a) gathering data from said data source;
       b) from said data, forming data frames to each have N data packets and a frame error code;
       c) transmitting said data frames;
       d) checking received data frames;
       e) routing data packets of error-free data frames;
       f) inserting the data packets of each data frame found to be in error in said checking step into a data frame of said forming step; and
       g) repeating said transmitting, checking, routing and inserting steps until all data packets are routed.

32. The communication system of claim 31, wherein said processor is further programmed to conduct the steps of:
    in response to said checking step, determining an error rate; and
    updating an integer value for N that enhances said data throughput.

33. The communication system of claim 32, wherein said updating step includes the step of changing N inversely to said error rate.

34. The communication system of claim 31, wherein said at least one transmission link is one of a group comprised of a wireless link, a wire link and an optical link.

35. The communication system of claim 31, wherein at least one of said data interconnection modules is one of a group comprised of a router, a switch and a bridge.

36. The communication system of claim 31, wherein said processor is included in a selected one of said data-interconnection modules, said transmitter and said receiver.

37. The communication system of claim 31, wherein said data source is one of a group comprised of a computer, a mobile telephone and a video source.

38. The communication system of claim 31, wherein said data sink is one of a group comprised of a computer, a mobile telephone and a video monitor.

* * * * *